United States Patent
De Jong et al.

(10) Patent No.: US 11,184,598 B2
(45) Date of Patent: Nov. 23, 2021

(54) METHOD FOR REDUCING CROSSTALK ON AN AUTOSTEREOSCOPIC DISPLAY

(71) Applicant: ZHANGJIAGANG KANGDE XIN OPTRONICS MATERIAL CO. LTD, Zhangjiagang (CN)

(72) Inventors: Pieter Wilhelmus Theodorus De Jong, 's-Hertogenbosch (NL); Jurjen Caarls, Eindhoven (NL); Jan Van Der Horst, Eindhoven (NL)

(73) Assignee: ZHANGJIAGANG KANGDE XIN OPTRONICS MATERIAL CO. LTD, Zhangjiagang (CN)

( * ) Notice: Subject to any disclaimer, the term of this patent is extended or adjusted under 35 U.S.C. 154(b) by 0 days.

(21) Appl. No.: 16/959,264

(22) PCT Filed: Dec. 24, 2018

(86) PCT No.: PCT/NL2018/050886
§ 371 (c)(1),
(2) Date: Jun. 30, 2020

(87) PCT Pub. No.: WO2019/132659
PCT Pub. Date: Jul. 4, 2019

(65) Prior Publication Data
US 2020/0336723 A1 Oct. 22, 2020

(30) Foreign Application Priority Data
Dec. 30, 2017 (NL) .................................... 2020216

(51) Int. Cl.
*H04N 13/125* (2018.01)
*H04N 13/305* (2018.01)
(Continued)

(52) U.S. Cl.
CPC ......... *H04N 13/125* (2018.05); *H04N 13/305* (2018.05); *H04N 13/31* (2018.05); *H04N 13/327* (2018.05); *H04N 13/366* (2018.05)

(58) Field of Classification Search
CPC .. H04N 13/125; H04N 13/305; H04N 13/327; H04N 13/31; H04N 13/366
(Continued)

(56) References Cited

U.S. PATENT DOCUMENTS 5,777,720 A * 7/1998 Shapiro .................. G02B 30/27
351/237
9,905,168 B1 * 2/2018 Richards ............ G02B 27/0172
(Continued)

FOREIGN PATENT DOCUMENTS

EP 0 769 881 4/1997

OTHER PUBLICATIONS

International Search Report for PCT/NL2018/050886 dated Jun. 18, 2019, 3 pages.
(Continued)

*Primary Examiner* — Tung T Vo
(74) *Attorney, Agent, or Firm* — Gang Yu

(57) ABSTRACT

The invention relates to a method for reducing crosstalk on an autostereoscopic display, wherein the display comprises an array of pixels lined with a view altering layer, such as a lenticular lens stack or parallax barrier, which display further comprises an eye tracking system for determining the position of the eyes of a viewer relative to the display, which method comprises the steps of: —defining a common nonlinear physical model for a view altering layer portion corresponding to a pixel or group of pixels, which nonlinear physical model has at least one variable for the position of the respective pixel or group of pixels relative to the display, a variable for the viewing position of the eyes of a viewer
(Continued)

relative to the display and parameters related to the variables; —calibrating the autostereoscopic display by repeating for all pixels or group of pixels of the display, the steps of: +obtaining calibration data by observing the visibility of a pixel or group of pixels from at least two viewing positions; +fitting the calibration data on the nonlinear physical model for the respective view altering layer portion to obtain the parameters related to the variables; and +storing the parameters for the respective view altering layer portion; —controlling the pixels of the autostereoscopic display to display 3D images, wherein the controlling comprises at least the steps of: +determining the viewing position of the eyes of a viewer using the eye tracking system; +rendering 3D images from image data taking into account the position of the pixels or group of pixels relative to the viewing position, while correcting the 3D images per pixel or group of pixels using the common nonlinear physical model and the stored parameters for the view altering layer portion corresponding to the pixel of group of pixels.

4 Claims, 3 Drawing Sheets

(51) Int. Cl.
*H04N 13/327* (2018.01)
*H04N 13/31* (2018.01)
*H04N 13/366* (2018.01)

(58) Field of Classification Search
USPC .......................................................... 348/59
See application file for complete search history.

(56) References Cited

U.S. PATENT DOCUMENTS

| | | | |
|---|---|---|---|
| 10,402,950 B1* | 9/2019 | Geng | G06T 5/006 |
| 2006/0268104 A1 | 11/2006 | Cowan et al. | |
| 2008/0024598 A1* | 1/2008 | Perlin | H04N 13/31 |
| | | | 348/55 |
| 2011/0261169 A1* | 10/2011 | Tin | H04N 13/133 |
| | | | 348/51 |
| 2012/0182403 A1* | 7/2012 | Lange | G06T 15/04 |
| | | | 348/51 |
| 2013/0050449 A1* | 2/2013 | Morohoshi | H04N 13/327 |
| | | | 348/54 |
| 2013/0156265 A1* | 6/2013 | Hennessy | H04N 13/383 |
| | | | 382/103 |
| 2016/0286206 A1* | 9/2016 | Yoshino | G02F 1/133345 |
| 2016/0360187 A1* | 12/2016 | Smithwick | G06T 19/20 |
| 2017/0122725 A1* | 5/2017 | Yeoh | G06T 19/006 |
| 2017/0295357 A1* | 10/2017 | Yang | H04N 13/398 |
| 2018/0376134 A1* | 12/2018 | Koerber | H04N 13/376 |
| 2019/0086679 A1* | 3/2019 | Ratcliff | G02B 27/0172 |
| 2019/0281280 A1* | 9/2019 | Baldwin | H04N 5/247 |
| 2020/0021796 A1* | 1/2020 | Russell | H04N 13/366 |

OTHER PUBLICATIONS

Written Opinion of the ISA for PCT/NL2018/050886 dated Jun. 18, 2019, 6 pages.

* cited by examiner

METHOD FOR REDUCING CROSSTALK ON AN AUTOSTEREOSCOPIC DISPLAY

This application is the U.S. national phase of International Application No. PCT/NL2018/050886 filed Dec. 24, 2018 which designated the U.S. and claims priority to NL Patent Application No. 2020216 filed Dec. 30, 2017, the entire contents of each of which are hereby incorporated by reference.

The invention relates to a method for reducing crosstalk on an autostereoscopic display, wherein the display comprises an array of pixels lined with a view altering layer, such as a lenticular lens stack or parallax barrier, which display further comprises an eye tracking system for determining the position of the eyes of a viewer relative to the display.

With an autostereoscopic display it is possible to provide the experience of three-dimensional images to a viewer without the viewer having to wear special glasses. The view altering layer, which is typically a lenticular lens stack or parallax barrier, provided on the display allows for pixels on the display only to be seen by either the left eye or right eye of a viewer. This provides the possibility to use the display and create distinct images for the left eye and the right eye, such that the viewer will experience a three-dimensional image.

The created distinct images displayed on the autostereoscopic display are based on a single viewing position of the viewer. As soon as the viewer shifts relative to the display, the images fall out of sync and the perception of an three-dimensional image is lost. To this end it is known to use an eye tracking system, which determines the position of the eyes, such that the generated image for the display can be adjusted to the position of the viewer.

Another aspect providing a disturbance in the perceived three-dimensional image is crosstalk. Due to the shape of the lenticular lens stack or parallax barrier, some light from a pixel will leak from the image of one eye to the other eye, such that in the image for the left eye a ghost image of the right eye is present and vice versa. It is known to compensate the image for the ghost image, such that crosstalk is reduced.

However, such crosstalk compensation is only effective if the autostereoscopic display is fully uniform and without any flaws. Due to manufacturing tolerances, this will however not be the case, such that there is typically at least some crosstalk in the three-dimensional image displayed on the autostereoscopic display.

The manufacturing tolerances could result from a non-uniform pitch over the lenticular lens stack, a non-uniform spacing between the lens stack and the pixels of the display, a non-uniform pitch between the pixels of the display or even between the sub-pixels, such that crosstalk could even differ between the three primary colors. Similar tolerances also apply to other principals for autostereoscopic displays, such as parallax barrier displays. Furthermore, reflections within the lens stack and lens aberrations could also lead to crosstalk.

US 2006 0268104 provides a method for further reducing crosstalk in a autostereoscopic display. In this publication it is suggested to apply a calibration step for the autostereoscopic display, such that the ghost images can be reduced further. To obtain the calibration data this publication refers to the method of U.S. Pat. No. 5,777,720. In U.S. Pat. No. 5,777,720 it is described that a test image is displayed and that a viewer determines the optimal viewing position. This position is then stored to be used in correcting the images depending on the position of the viewer.

With this calibration method it is possible to provide a correction depending on the position of the eyes of the viewer. It is even possible to provide separate correction values for groups of pixels or specific pixels of the display, but this will generate a substantial amount of calibration data.

This calibration data can be stored in tables, such that correction values can be looked up during the rendering of the images. However, the amount of data, especially with a per pixel crosstalk compensation, is such that a substantial amount of memory is needed and sufficient processing power to be able to provide the crosstalk correction realtime.

It is desired to be able to produce autostereoscopic displays to which simple image data can be supplied and wherein the display converts this image data in a three-dimensional image. As a result of the required processing power, the cost for the controller in the display would be too high if the calibration method according to the prior art would be used. Especially, the amount of memory required to store the calibration data would increase the costs excessively.

Accordingly, it is an object of the invention to reduce or even remove the above mentioned disadvantages.

This object is achieved according to the invention with a method for reducing crosstalk on an autostereoscopic display, wherein the display comprises an array of pixels lined with a view altering layer, which display further comprises an eye tracking system for determining the position of the eyes of a viewer relative to the display, which method comprises the steps of:

defining a common nonlinear physical model for a view altering layer portion corresponding to a pixel or group of pixels, which nonlinear physical model has at least one variable for the position of the respective pixel or group of pixels relative to the display, a variable for the viewing position of the eyes of a viewer relative to the display and parameters related to the variables;

calibrating the autostereoscopic display by repeating for all pixels or group of pixels of the display, the steps of:
  obtaining calibration data by observing the visibility of a pixel or group of pixels from at least two viewing positions;
  fitting the calibration data on the nonlinear physical model for the respective view altering layer portion to obtain the parameters related to the variables; and
  storing the parameters for the respective view altering layer portion;

controlling the pixels of the autostereoscopic display to display 3D images, wherein the controlling comprises at least the steps of:
  determining the viewing position of the eyes of a viewer using the eye tracking system;
  rendering 3D images from image data taking into account the position of the pixels or group of pixels relative to the viewing position, while correcting the 3D images per pixel or group of pixels using the common nonlinear physical model and the stored parameters for the view altering layer portion corresponding to the pixel of group of pixels.

With the method according to the invention a common nonlinear physical model for a view altering layer portion is defined, such that calibration data for a pixel or group of pixels can be fitted and a limited number of parameters only need to be stored. The stored parameters then can be used with the same common linear physical model to reproduce the calibration data and to correct the rendered images.

As a result the amount of memory can be reduced drastically, reducing costs and making a display with integrated crosstalk correction economically viable.

Because crosstalk is at least dependent on the position of the viewer relative to the display and on the position of the pixel or group of pixels for which crosstalk is to be corrected, the nonlinear model has at least as input these variables. The model further takes into account the physical shape and dimensions of the view altering layer and of the pixels.

The calibration data is obtained by observing the pixels or group of pixels from at least two viewing positions, such that for a specific autostereoscopic display it is determined if a specific pixel or group of pixels is viewable as expected, or that a correction is required due to manufacturing tolerances. The observing can be done by a camera, which has a sufficient resolution to avoid moire effects, by zooming in on specific pixels of the display and/or defocusing the camera, as only the visibility of a pixel has to be observed. Also, changing the viewing position can be automated by arranging the camera on a robot arm or the like, which allows the camera to be positioned in the plurality of viewing positions.

Preferably, an interpolation is used for a group of pixels to determine the correction per pixel. Although a constant correction value for a group of pixels could be used, having an interpolation would further increase the accuracy of the crosstalk compensation.

In yet a further embodiment of the method according to the invention each pixel comprises at least two sub-pixels, preferably three sub-pixels. These three sub-pixels will typically produce the three primary colors, red, green and blue.

In a further preferred embodiment of the method according to the invention the common nonlinear physical model furthermore comprises a variable and corresponding parameter corresponding to a specific sub-pixel and wherein during obtaining calibration data the visibility of each sub-pixel within a pixel is observed.

As the sub-pixels are arranged adjacent to each other, the position of each sub-pixel will vary slightly relative to the display. As a result of this slight difference in position, there is some difference in the ghost image when split into the three primary colors. So, by correcting on a sub-pixel level, the crosstalk would be further reduced. In order to obtain the correction values from the model, the model is provided with a variable indicating the specific sub-pixel.

In yet another preferred embodiment of the method according to the invention, the common nonlinear physical model furthermore comprises a variable and corresponding parameter corresponding to the six degrees of freedom movement of the eyes and wherein the eye tracking system determines, during controlling the pixels of the display, said six degrees of freedom movement of the eyes of the viewer.

Both positions in three dimensions of each of the eyes, when viewing the display, have influence on the observed crosstalk. If a viewer would look from the corners of the eyes, then the effective distance between the eyes would be less then when the viewer would look straight forward. Also, such changes have an effect on the perceived crosstalk and can be compensated for if the nonlinear physical model takes these changes into account.

However, for a simplified method according to the invention, the center between the two eyes of the viewer could be used.

These and other features of the invention will be elucidated in conjunction with the accompanying drawings.

Figure 1:
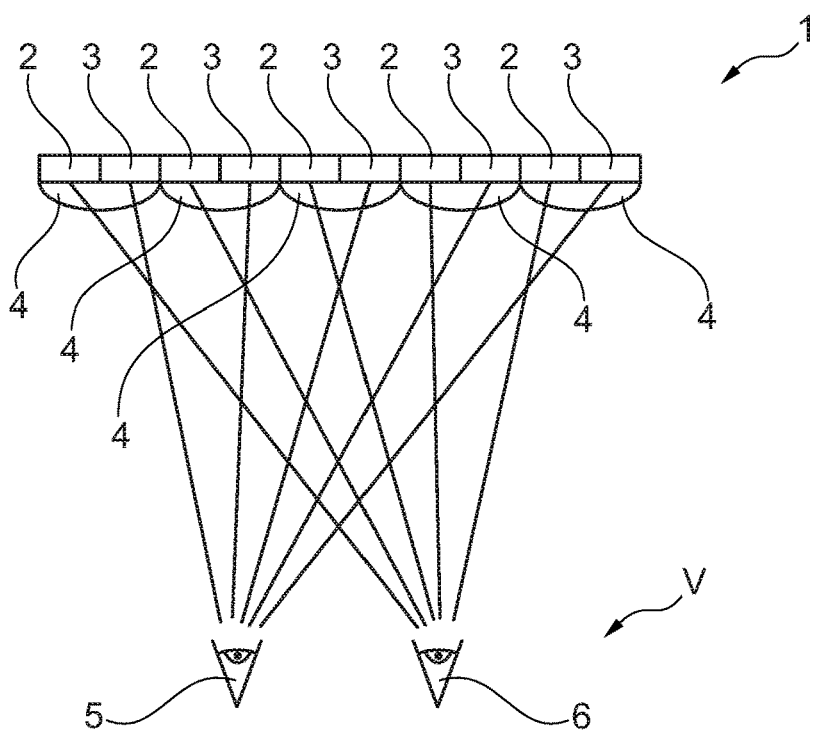
FIG. 1 shows schematically the basic functioning of an autostereoscopic display.

FIG. 1 shows schematically an autostereoscopic display 1 having an array of pixels 2, 3 lined with a lenticular lens stack 4. The pixels 2, 3 have typically three sub-pixels, like a red, green and blue sub-pixel. These sub-pixels are however not shown in the figures for clarity sake.

When a viewer V looks at the screen with the left eye 5 and right eye 6, the lenticular lenses of the lens stack 4 will direct the light of the pixels 2 towards the right eye 6, while the light of the pixels 3 is direct into the left eye 5. So, when the viewer V is positioned correctly in front of the display 1, the left eye 5 will only see pixels 3, while the right eye 6 will only see pixels 2. This enables one to create with the pixels 2 an image different from the image created with the pixels 3. As a result the viewer V will experience a three-dimensional image.

Figure 2:
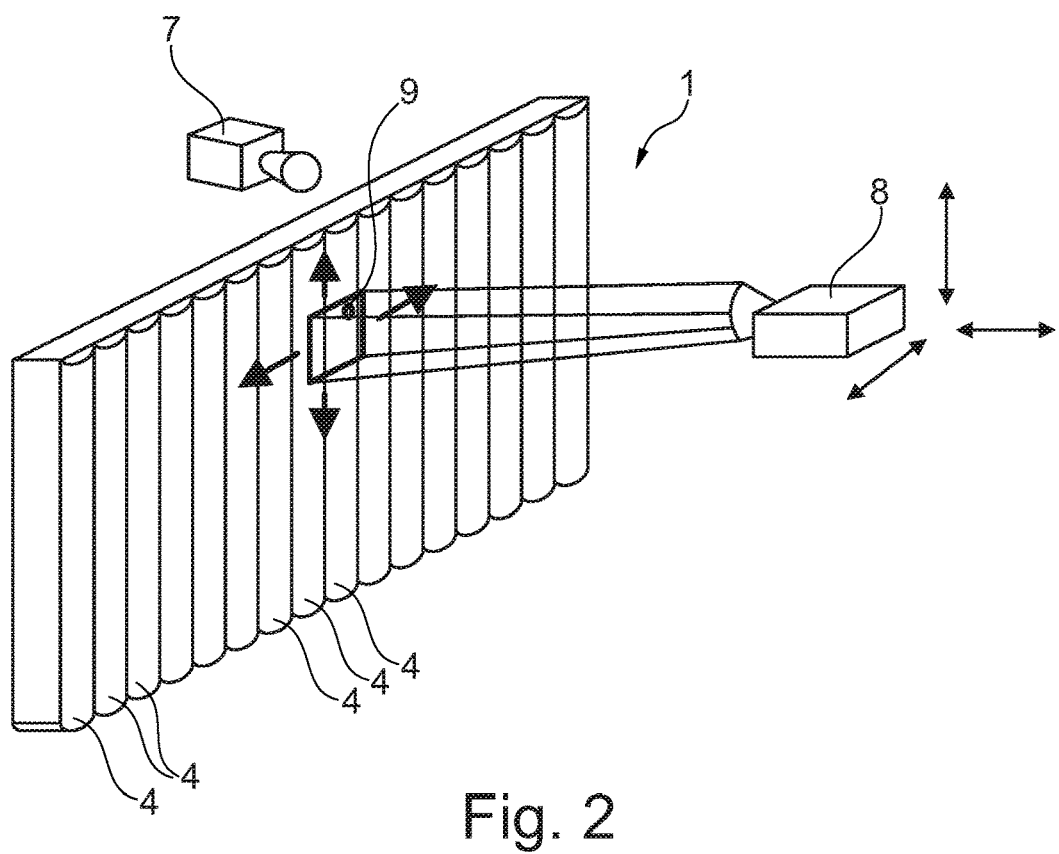
FIG. 2 shows schematically the autostereoscopic display of FIG. 1 with eye tracking and a camera for obtaining calibration data.

FIG. 2 shows the display 1 with an eye tracking system 7 mounted above the display 1, to establish the position of the eyes 5, 6 of the viewer V relative to the display 1.

In order to obtain calibration data, a camera 8 is positioned in front of the display 1 and observes a group of pixels 9. The observation data is processed according to the method of the invention, which will be elucidated in conjunction with FIGS. 3A and 3B.

After observing the group pixels 9, a next group of pixels is observed and processed, such that the full surface of the display 1 has been observed.

Then the camera 8 is moved to a next position, which can be in any three-dimensional direction, and the display 1 is scanned and observed again.

Figure 3A:
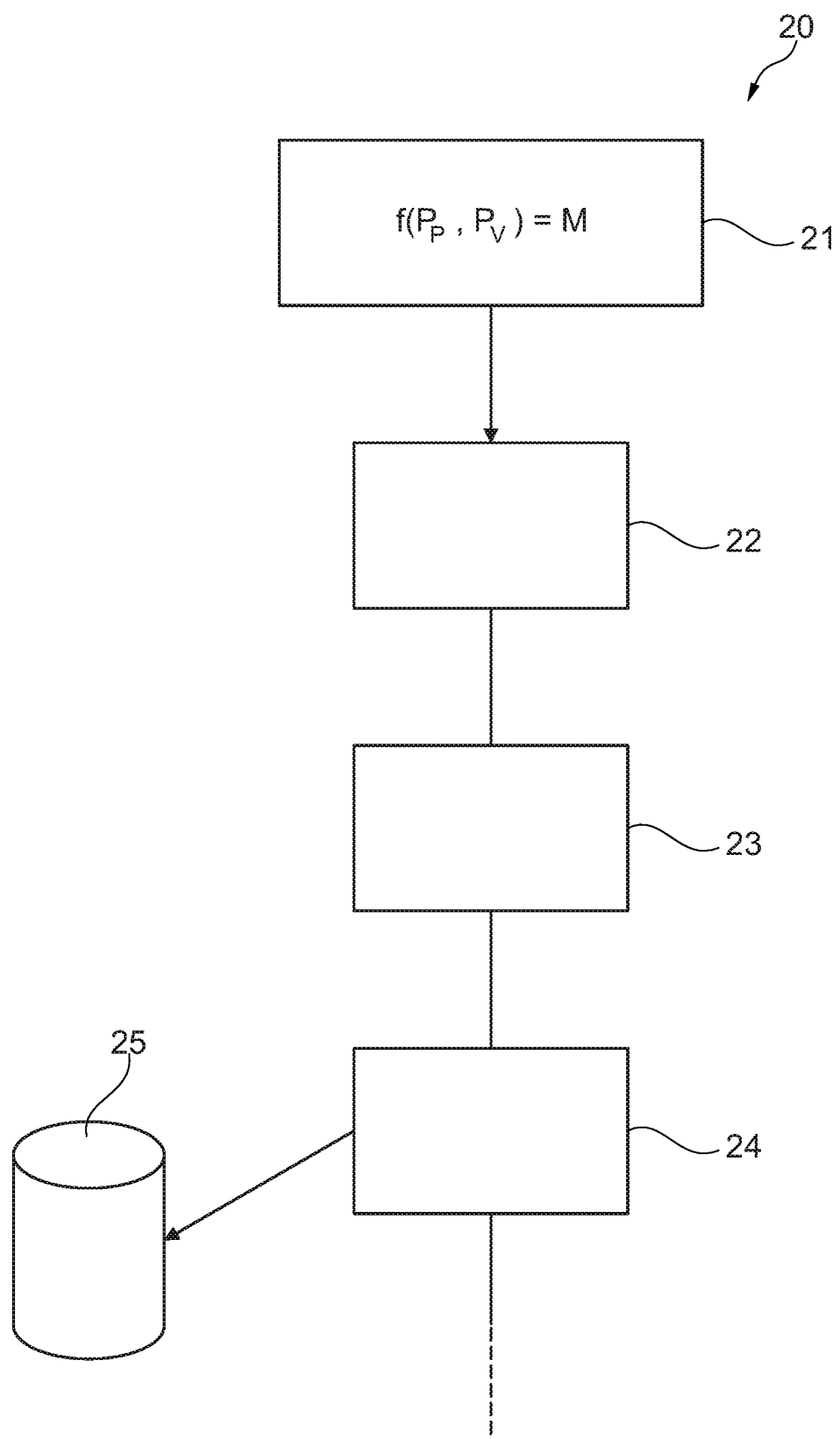
FIGS. 3A and 3B show a diagram of an embodiment of the method according to the invention.
Figure 3B:
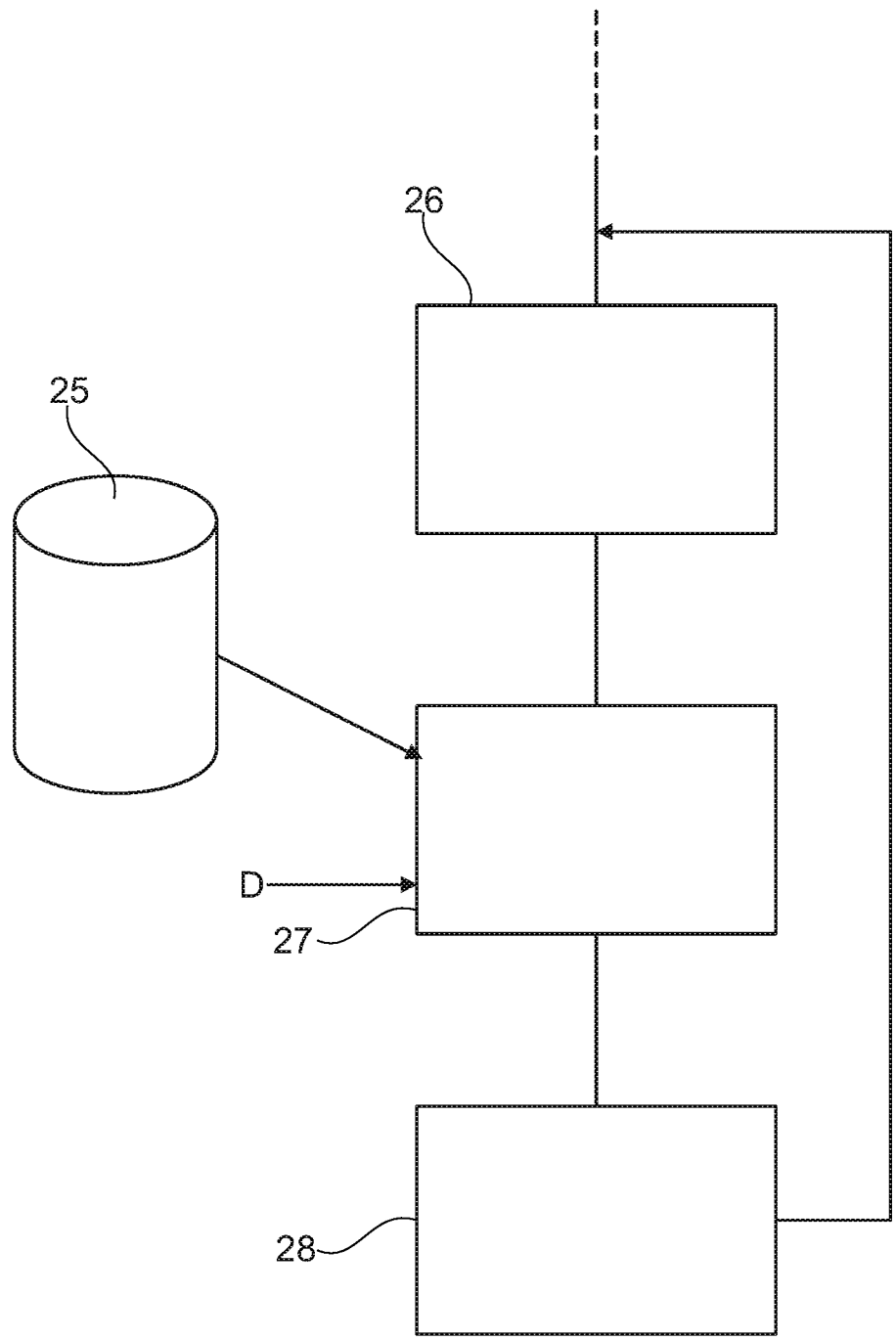

FIGS. 3A and 3B show a diagram 20 of the method according to the invention, which diagram starts in FIG. 3A and continues in FIG. 3B.

In step 21 a common nonlinear physical model M for the lenticular lens stack portion 4 corresponding to a pixel 2,3 or group of pixels 9 is defined. This model M has at least a variable for the position of a pixel $P_p$ and a variable for the position P of the eyes of the viewer V relative to the display 1. The model can be dependent on more variables, such a sub-pixel position and the six degrees of freedom movement of the eyes, but for clarity a simple model M is shown in the figures.

In the next step 22 the pixel 2, 3 or group of pixels 9 is observed, as explained in FIG. 2, to obtain calibration data for a specific pixel from a specific viewing position.

After all calibration data is obtained for all pixels 2, 3 or group of pixels 9 from a number of viewing positions, the calibration data for a specific pixel 2, 3 or group of pixels 9 is fitted in step 23 on the model M to obtain a number of parameters, estimating the calibration data for said specific pixel 2, 3 or group of pixels 9 dependent on the viewing position P. These parameters are stored in step 24 into a memory 25.

Continuing in FIG. 3B, the stored parameters are now used in a production situation. According to the invention, the position of the viewer V relative to the display 1 is determined by the eye tracking system 7 in step 26.

This viewing position is then used in combination with the model M and the parameters stored in the memory 25 to render 3D images from image data D in step 27. The rendered 3D images are used to control the pixels 2, 3 of the display 1 in step 28.

Then the cycle of steps 26, 27, 28 is repeated with new image data D to render and display a new 3D image.

The invention claimed is:

1. Method for reducing crosstalk on an autostereoscopic display, wherein the display comprises an array of pixels lined with view altering layer, such as a lenticular lens stack or parallax barrier, which display further comprises an eye tracking system for determining the position of the eyes of a viewer relative to the display, which method comprises the steps of:
   defining a common nonlinear physical model for a view altering layer portion corresponding to a pixel or group of pixels, which nonlinear physical model has at least one variable for the position of the respective pixel or group of pixels relative to the display, a variable for the viewing position of the eyes of a viewer relative to the display and parameters related to the variables;
   calibrating the autostereoscopic display by repeating for all pixels or group of pixels of the display, the steps of:
   obtaining calibration data by observing the visibility of a pixel or group of pixels from at least two viewing positions;
   fitting the calibration data on the nonlinear physical model for the respective view altering layer portion to obtain the parameters related to the variables; and
   storing the parameters for the respective view altering layer portion;
   controlling the pixels of the autostereoscopic display to display 3D images, wherein the controlling comprises at least the steps of:
   determining the viewing position of the eyes of a viewer using the eye tracking system;
   rendering 3D images from image data taking into account the position of the pixels or group of pixels relative to the viewing position, while correcting the 3D images per pixel or group of pixels using the common nonlinear physical model and the stored parameters for the view altering layer portion corresponding to the pixel of group of pixels;
   wherein the common nonlinear physical model furthermore comprises a variable and corresponding parameter corresponding to the six degrees of freedom movement of the eyes and wherein the eye tracking system determines, during controlling the pixels of the display, said six degrees of freedom movement of the eyes of the viewer.

2. Method according to claim 1, wherein for a group of pixels an interpolation is used to determine the correction per pixel.

3. Method according to claim 1, wherein each pixel comprises at least two sub-pixels, preferably three sub-pixels.

4. Method according to claim 3, wherein the common nonlinear physical model furthermore comprises a variable and corresponding parameter corresponding to a specific sub-pixel and wherein during obtaining calibration data the visibility of each sub-pixel within a pixel is observed.

* * * * *